United States Patent
Pavani

(10) Patent No.: US 9,183,616 B2
(45) Date of Patent: Nov. 10, 2015

(54) SYSTEM AND METHOD FOR OBTAINING SUPER IMAGE RESOLUTION THROUGH OPTICAL IMAGE TRANSLATION

(71) Applicant: ARECONT VISION, LLC., Glendale, CA (US)

(72) Inventor: Sri Rama Prasanna Pavani, Los Angeles, CA (US)

(73) Assignee: Arecont Vision, LLC., Glendale, CA (US)

( * ) Notice: Subject to any disclaimer, the term of this patent is extended or adjusted under 35 U.S.C. 154(b) by 125 days.

(21) Appl. No.: 14/153,778

(22) Filed: Jan. 13, 2014

(65) Prior Publication Data

US 2015/0199792 A1    Jul. 16, 2015

(51) Int. Cl.
- *G06K 9/40* (2006.01)
- *G06T 3/40* (2006.01)
- *G06T 5/00* (2006.01)
- *G06T 3/20* (2006.01)

(52) U.S. Cl.
CPC .......... *G06T 3/4053* (2013.01); *G06T 3/20* (2013.01); *G06T 5/00* (2013.01)

(58) Field of Classification Search
CPC .............. G06T 3/00; G06T 3/20; G06T 3/40; G06T 3/4069; G06T 3/4053; G06T 5/00; G06T 5/003; G06T 5/20; G06T 5/50; G06T 7/20; H04N 1/387; H04N 5/14; H04N 5/232; H04N 5/262; H04N 5/23251; H04N 5/23264; H04N 5/23267; H04N 7/01; H04N 7/70125; H04N 7/014; H04N 7/18; H04N 7/26; H04N 7/46; H04N 7/50; H04N 11/20; H04N 19/109; H04N 19/112; H04N 19/23; H04N 19/33; H04N 19/34; H04N 19/59; H04N 19/61; A01B 12/006; G01J 3/0229; G01J 3/2823; G01R 33/54; G01R 33/5608; G01R 33/563; G01N 21/4795; G01N 21/6458; G02B 7/365; G02B 7/40; G02B 21/06; G02B 21/14; G02B 27/0025; G02B 27/46; G02B 27/52; G02B 27/0075; G03B 2205/0007; G03B 2217/005

See application file for complete search history.

(56) References Cited

U.S. PATENT DOCUMENTS 7,218,448 B1 *   5/2007   Cathey et al. ................ 359/558
7,436,595 B2 *  10/2008   Cathey et al. ................ 359/558

* cited by examiner

*Primary Examiner* — Jose Couso

(74) *Attorney, Agent, or Firm* — Christie, Parker & Hale, LLP

(57) ABSTRACT

A method and system for enhancing image resolution using optical image translation, including: receiving multiple dissimilar low-resolution images generated by a time varying linear phase mask (LPM); receiving a direction vector for each of the multiple dissimilar low-resolution images; interleaving the received multiple dissimilar low-resolution images using the received direction vectors to form an intermediate high-resolution image; computing a likelihood of pixel motion in the intermediate high-resolution image; compensating for pixel motion in the intermediate high-resolution image; and generating a final high-resolution image.

20 Claims, 16 Drawing Sheets

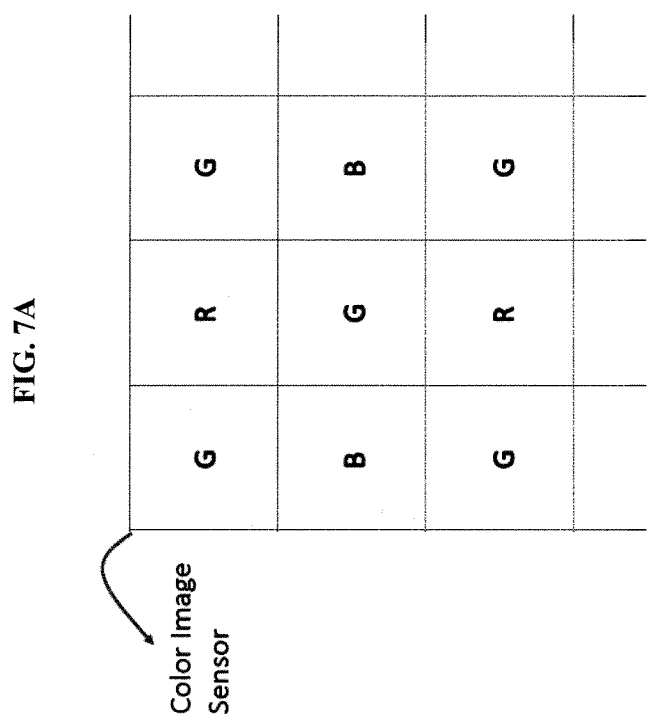

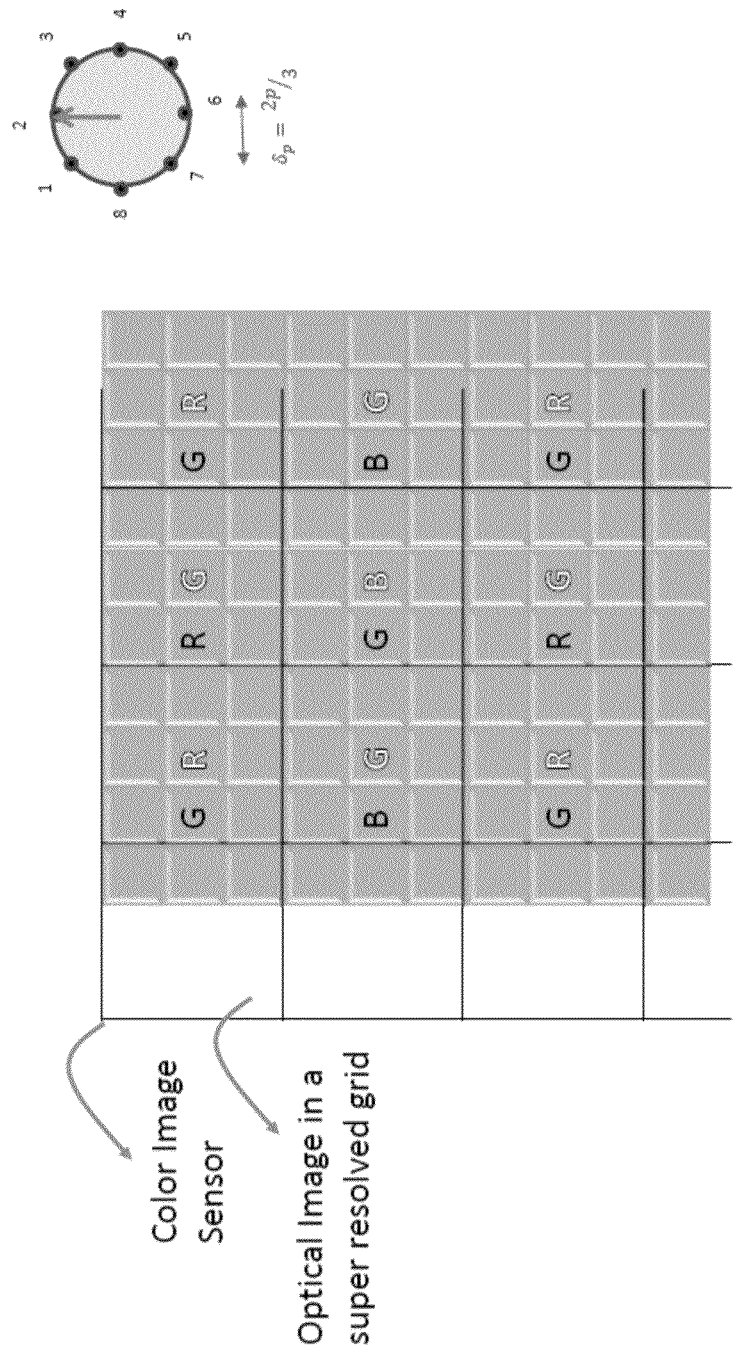

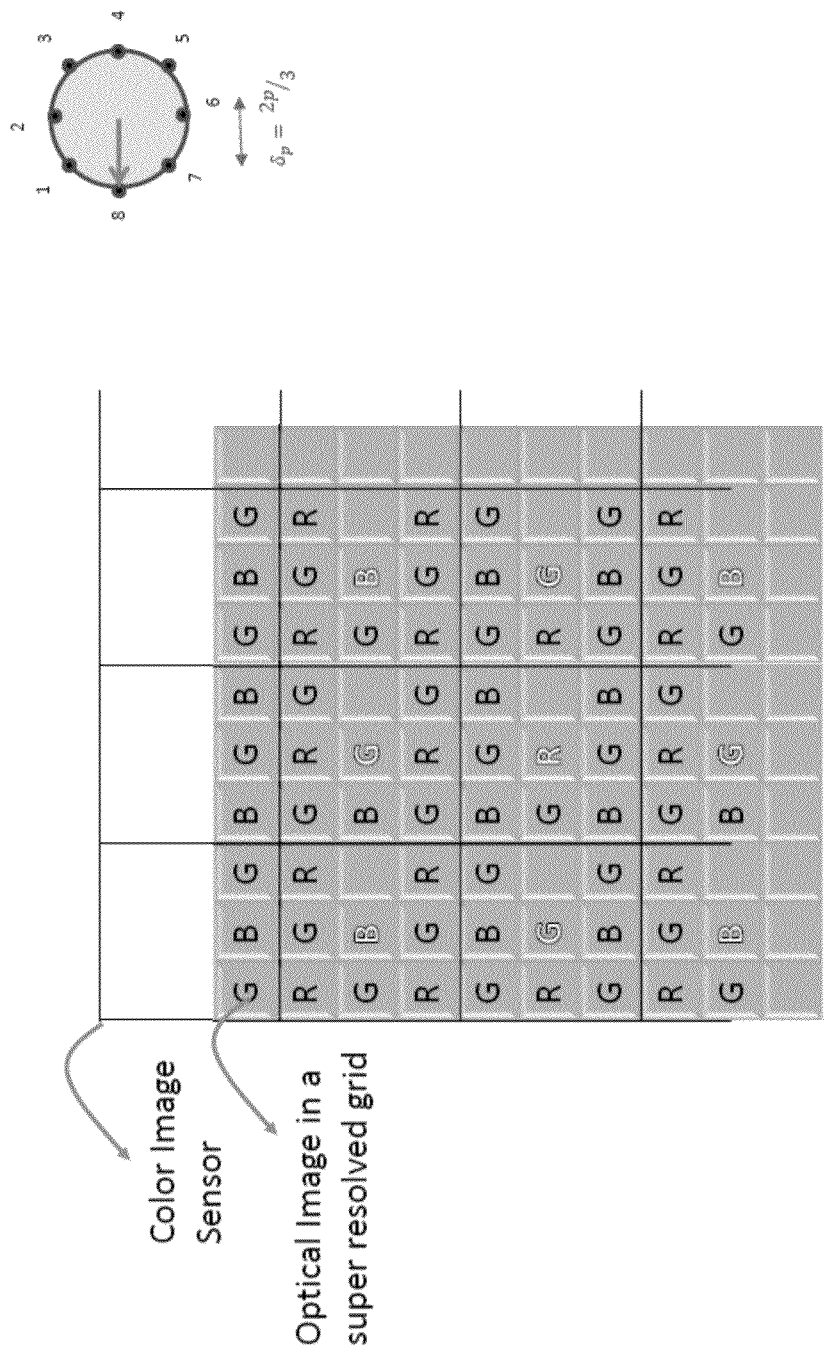

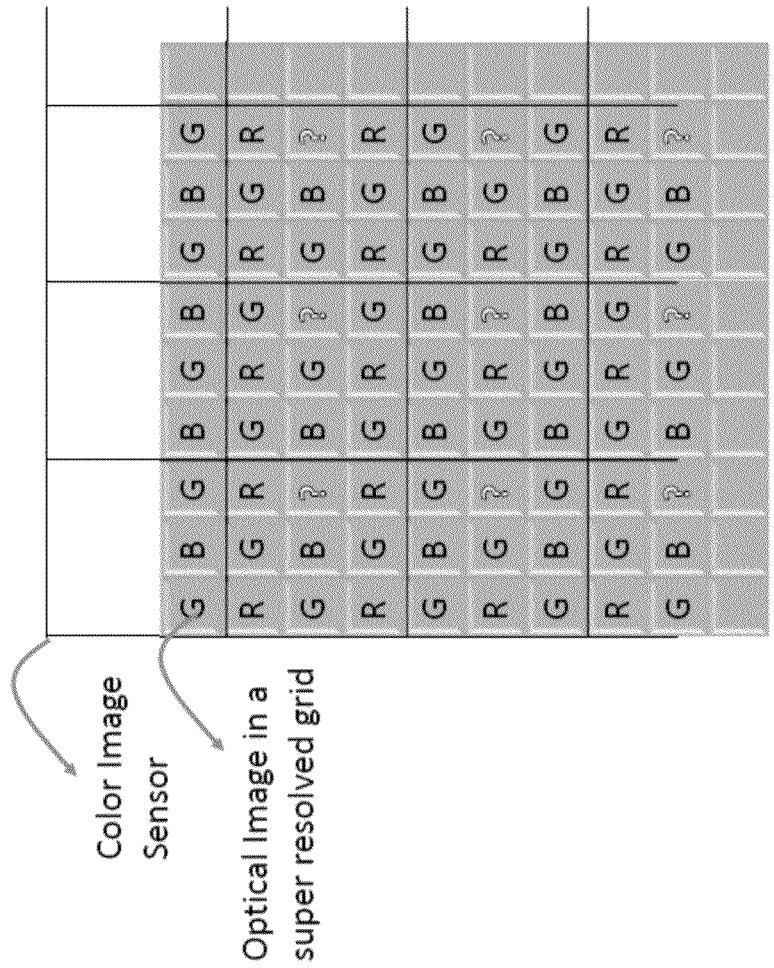

SYSTEM AND METHOD FOR OBTAINING SUPER IMAGE RESOLUTION THROUGH OPTICAL IMAGE TRANSLATION

FIELD OF THE INVENTION

The present invention relates to image processing and more particularly to a system and method for enhancing image resolution using optical image translation.

BACKGROUND

Videos and images in a low light environment typically sacrifice resolution for improved sensitivity by using sensors with large pixel size and thus low pixel count for the same size of the sensor. The low number of photons in the low light environment need a large pixel size to improve light sensitivity. However, for a camera with a given form factor, increasing pixel size can result in degradation in image quality due to reduction in pixel count. Increasing the exposure time of a camera to allow collection of more photons reduces noise, but large exposure time values could increase motion blur due to potential object motion within the exposure period. Several solutions have been proposed to remedy image resolution in a low light environment. For example, the conventional up-sampling and interpolation methods create "fake pixels" to increase pixel count, but these interpolated pixels are not true pixels, rather an approximation of a true pixel, based on the neighboring pixels.

Other methods may use multiple or moving cameras to capture multiple images from different angles and combine them to enhance the resolution. However, the multiple camera approach requires multiple lenses and multiple sensors, thereby increasing the cost and size of the camera system. Moving cameras, or moving sensor requires precise shifting of the whole camera or of the sensor, which substantially increases the cost and degrades the reliability of the camera system.

Super resolution methods such as "dictionary learning" predict a high resolution image from a single-low resolution image, but they are computationally intensive and require a large memory.

Accordingly, there is a need for an enhanced video image processing system and technique that produces an increased image resolution based on the image(s) captured by the sensor, without requiring a complex architecture, large memory, and/or high processing power.

SUMMARY

The present invention is a system and method for enhancing image resolution using optical image translation and to generate images with more resolution than offered by the image sensor.

In some embodiments, the present invention is a method for enhancing image resolution using optical image translation. The method including: receiving multiple dissimilar low-resolution images generated by a time varying linear phase mask (LPM); receiving a direction vector for each of the multiple dissimilar low-resolution images; interleaving the received multiple dissimilar low-resolution images using the received direction vectors to form an intermediate high-resolution image; computing a likelihood of pixel motion in the intermediate high-resolution image; compensating for pixel motion in the intermediate high-resolution image; and generating a final high-resolution image. The method is executed by one or more processors including the associated known components such as memory, I/O and interface logic.

In some embodiments, the present invention is a system for enhancing image resolution using optical image translation. The system includes: an optical lens for collecting light from an image; a time varying LPM for generating multiple dissimilar low-resolution images from the lens and a direction vector for each of the multiple dissimilar low-resolution images; an image sensor for detecting the multiple dissimilar low-resolution images generated by the LPM; and a processor configured to interleave the received multiple dissimilar low-resolution images using the received direction vectors to form an intermediate high-resolution image; compute a likelihood of pixel motion in the intermediate high-resolution image; compensate for pixel motion in the intermediate high-resolution image; and generate a final high-resolution image.

The LPM may be a passive rotating mask, an active liquid crystal based mask or an active liquid lens based mask. In some embodiments, the number of multiple dissimilar low resolution images is determined by a super-resolution factor, as a function of a pixel pitch and a dead space between pixels of an image sensor.

In some embodiments, the interleaving comprises: creating an empty high resolution pixel grid; and populating said empty high resolution pixel grid with pixels from the multiple dissimilar low resolution images using their respective direction vectors to generate said intermediate high resolution pixel grid.

In some embodiments, the populating comprises: overlapping a high resolution pixel grid representing an optical image on top of each of the multiple dissimilar low resolution images; and translating the optical image on a surface of an image sensor, using time-varying shifts of the LPM.

BRIEF DESCRIPTION OF THE DRAWINGS

FIGS. 7A-7K depicts various pixel grids generated by a LPM, enhancing image resolution.

DETAIL DESCRIPTION

In some embodiments, the present invention processes multiple dissimilar lower resolution images to generate a higher resolution image. Unlike up-sampling/interpolation, which creates "fake pixels" to increase pixel count, super resolution truly resolves fine details not detected by sensor. In some embodiments, the multiple dissimilar (lower resolution) images are generated by a time varying linear phase mask (LPM) situated between the lens and the sensor.

Figure 1:
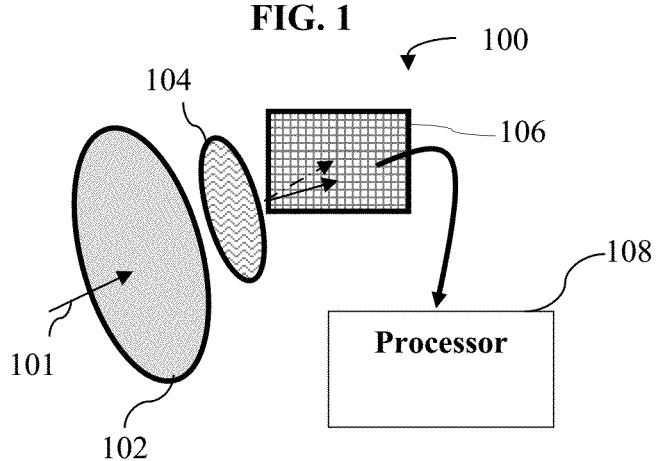
FIG. 1 is an exemplary block diagram for a camera system, according to some embodiments of the present invention.

FIG. 1 is an exemplary block diagram for a camera system, according to some embodiments of the present invention. As shown, the camera system 100 includes a lens 102, a time varying linear phase mask (LPM) 104 a sensor 106 and a processor for processing the images captured by the sensor 106. Light 101 collected by the lens 102 passes through the time-varying LPM 104, before it is detected by the sensor 106. That is, the optical radiation from lens is translated on the sensor using the time-varying LPM 104. The LPM is designed to introduce time-varying lateral shifts to the optical radiation (from a scene) and thus generate dissimilar optical images for the sensor 106. These successive dissimilar images detected by sensor exhibit dissimilar shifts introduced by the LPM. Subsequently, the multiple dissimilar images from sensor are combined with a super resolution (SR) algorithm, executed by processor 108 to generate a higher resolution image, which has more "true pixels" than those from the sensor. Although processor 108 is depicted by a single block, one skilled in the art would recognize that the block include a processing unit, associated storage and input/output circuitry, network interface, user interface and other typical circuitry to make the processor 108 fully functional for the purposes of the present invention.

The LPM 104 generates a linear phase shift in a plane close to the lens. Since the Fourier Transform of a linear phase shift is a translational shift, the LPM causes a translational shift of the optical radiation on the image sensor. The direction of orientation of LPM corresponds to the direction of this translational shift. The LPM has a linear phase ramp whose axis can be oriented at any angle between 0° and 360°. The LPM may be a passive or an active LPM.

Figure 2:
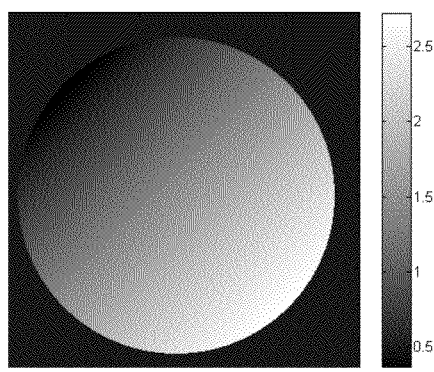
FIG. 2 depicts the phase profiles of a LPM, according to some embodiments of the present invention.

FIG. 2 depicts the phase profiles of a LPM, according to some embodiments of the present invention. As shown, a planar piece of glass or plastic with linearly increasing thickness is used as a passive LPM that is rotatable along a plane parallel to the plane of the lens. The rotating LPM may be embedded in the lens module or positioned between lens and sensor as a separate unit. As the LPM with linearly changing thickness is rotated, the optical radiation from the scene undergoes an angular shift at the plane of the LPM. The angular shift of the optical radiation at the LPM plane creates a translational shift at the image sensor plane. Since the angle of the translational shift on the image sensor plane changes as the LPM rotates, subsequent images detected by the image sensor exhibit dissimilar image shifts.

Figure 3:
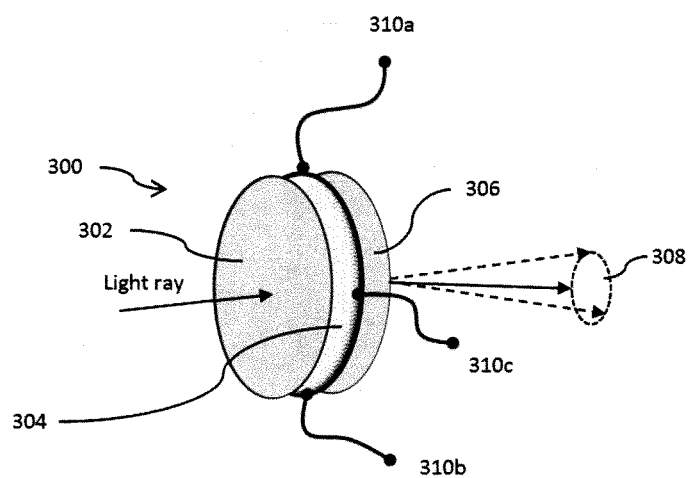
FIG. 3 is an active LPM, according to some embodiments of the present invention.

FIG. 3 shows an exemplary active LPM 300, according to some embodiments of the present invention. In some embodiments, the active LPM uses an electro-optical phase shifter 304, for example, a liquid crystal optical element sandwiched between a first optical flat window 302 and a second optical flat window 306, and electrically controlled (by a voltage or current) via electrodes 310a-310c, to generate time-varying phase shifts. In some embodiments, the active LPM may be realized by a liquid lens or other available technologies that have their shape or effective reflection index changed by having electrical signals applied thereto. These electrical signals control the active LPM to produce time-varying linear phase shifts at the LPM plane, which in turn produce translational shifts in the image sensor plane, as shown by item 308. In comparison to a passive LPM, an active LPM has the advantage of using no mechanically rotating parts.

Figure 4:
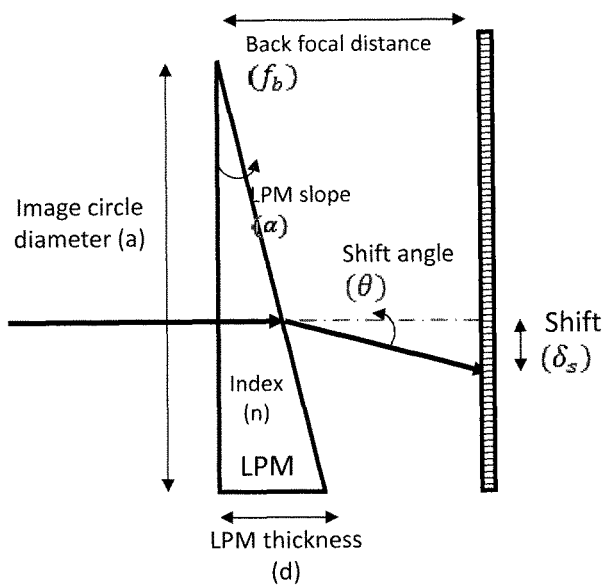
FIG. 4 illustrates the design parameters and considerations for a passive LPM, according to some embodiments of the present invention.

FIG. 4 illustrates the design parameters and considerations for a passive LPM, according to some embodiments of the present invention. As shown, the image circle (LPM active area) diameter is designated by "a," the LPM maximum thickness by "d," the shift angle of the light caused by the LPM by θ, the LPM slope by α, the shift distance on the image sensor by $\delta_s$, and the back focal distance by $f_b$. Accordingly, the LPM slope by α is determined by the following:

$$\alpha = \tan^{-1}\left[\frac{\sin(\theta)}{n - \cos(\theta)}\right] \text{ where}$$

$$\theta = \tan^{-1}\left(\frac{\delta_s}{f_b}\right)$$

For example, for n=1.5 (glass), p=3.75 um, $\delta_s$=0.8*p, $f_b$=4 mm, a=6.71 mm α=0.09°, d=10.1 um, θ=0.04°. The magnitude of shift of the optical radiation on the surface of the image sensor ($\delta_s$) should be a non-integral multiple of pixel pitch (p) in order to acquire dissimilar images. In some cases, $\delta_s$ can be less than the pixel pitch. In particular, we have determined that choosing $\delta_s$ as 0.8*p allows excellent color sampling when the optical radiation is shifted along a circular locus on a Bayer color image sensor.

Figure 5:
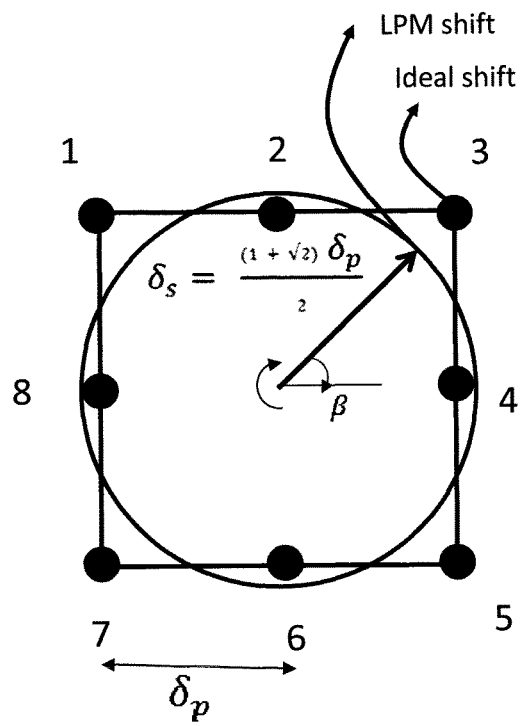
FIG. 5 shows shifting of a passive LPM, according to some embodiments of the present invention.

When the locus of the shifts is confined to a circle, an optimal value for $\delta_s$ may be derived as described below. An optimal shift for the LPM is described with respect to FIG. 5, according to some embodiments of the present invention. As illustrated, there are eight LPM orientations (β) that provide eight slightly different translated images. The rotational motion (passive LPM) or electro-optical controls (active LPM) constrains the shifts to lie on the contour of a circle on sensor plane. However, commercial sensor pixels are arranged on a rectilinear grid, leading to a mismatch between ideal and achievable shifts of the LPM. An optimal value for shift ($\delta_s$) is determined as $$\delta_s = \frac{(1 + \sqrt{2})\delta_p}{2}$$

where $\delta_p$ is the desired ideal pixel shift and $\delta_s$ is the most optimal achievable pixel shift achievable by LPM.

The magnitude and direction of image shift is a design parameter consideration in the design of a super resolution camera. For example, in color image sensors, it is desirable to generate super resolution images with adequate color sampling. For improved color accuracy, it is desirable to subsample a single low resolution pixel to multiple high resolution pixels with diverse colors. For example, in a 4× super resolution system, it is desirable to subsample a green low resolution pixel into two green, one blue, and one red high resolution pixels. The alternative approach of decomposing the green low resolution pixel into four green high resolution pixels is not desirable due to lack of diversity of colors in the super-resolved region. In a Bayer color image sensor, we have determined that image shifts along a circular locus with $\delta_p$=2*p/3 and $\delta_s$=0.8*p leads to as much as 8× super-resolution with excellent color diversity. Thus, the ideal image shift $\delta_p$ can be transformed into an optimal image shift $\delta_s$ achievable when the images are shifted along a circular locus.

Figure 6:
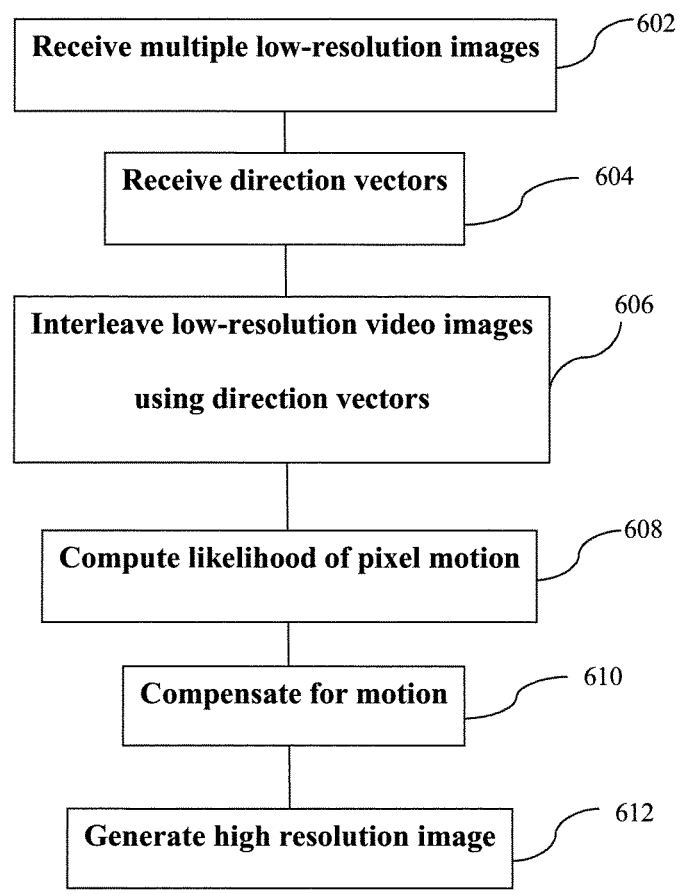
FIG. 6 is an exemplary process flow for enhancing image resolution, according to some embodiments of the present invention.

FIG. 6 is an exemplary process flow for enhancing image resolution, according to some embodiments of the present invention. The process according to FIG. 6 is executed by one or more processors, for example, processor 108 shown in FIG. 1. In block 602, multiple low-resolution images (for example, video frames), acquired with different LPM shifts, are received from an image sensor. These images may be pre-processed and filtered according to conventional methods.

Each low-resolution frame has a direction vector associated with it. The direction vectors quantify the angle and magnitude of image shift, shifted by the LPM. The direction vectors may specify absolute shifts or specify shifts relative to the previous image. In block 604, direction vectors corresponding to the received multiple low-resolution images are received from the LPM. In the case of a passive LPM, the magnitude of the image shift is fixed by the passive LPM design. Therefore the only variable in the direction vector is the angle. In some embodiments, a motor attached to the passive LPM rotates the LPM. For example, a processor instructs the motor to rotate to a particular angle and returns that angle to the super resolution process. In an active LPM, both magnitude and angle of the shifts are variables. For example, active LPM designs based on liquid crystals or liquid lenses may be electrically controlled to achieve arbitrary direction vectors. In these cases, the processor instructs the active LPM to implement a particular shift magnitude and angle and returns those values to the super resolution process.

Figure 7B:
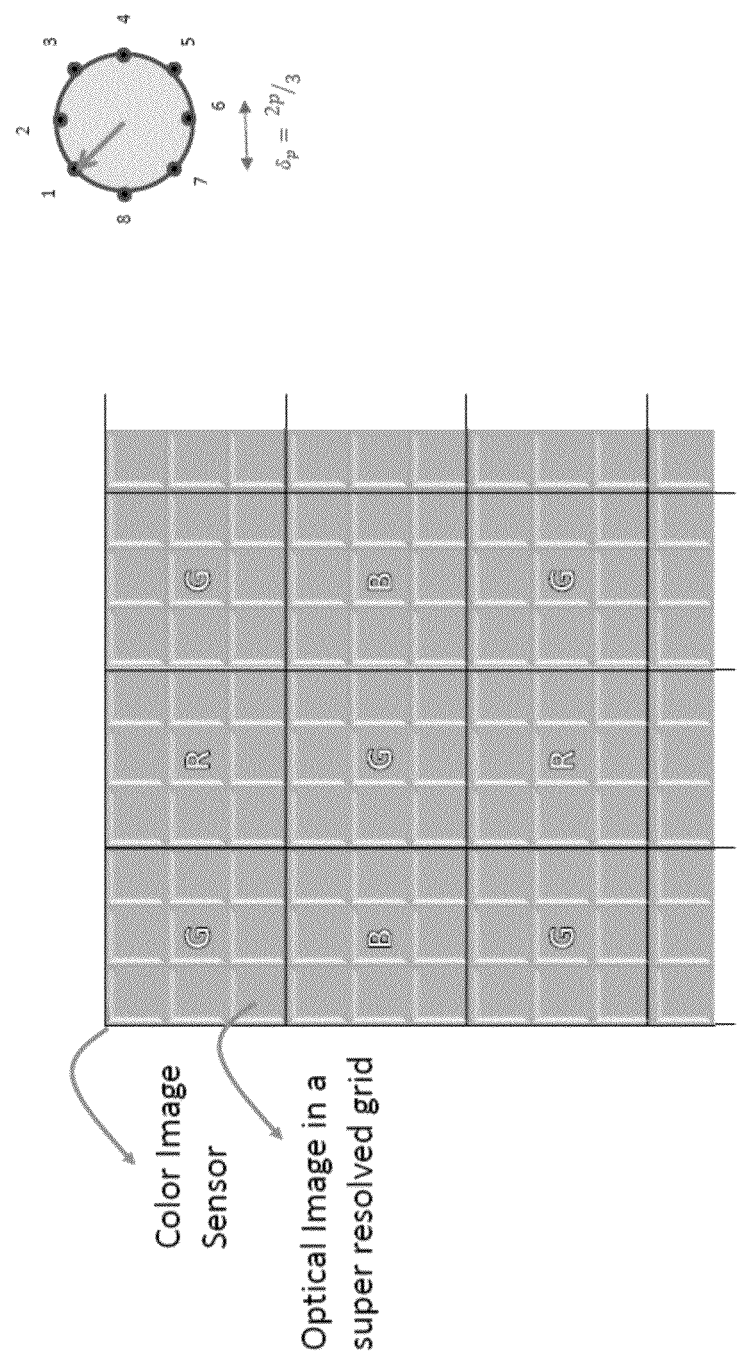
Figure 7D:
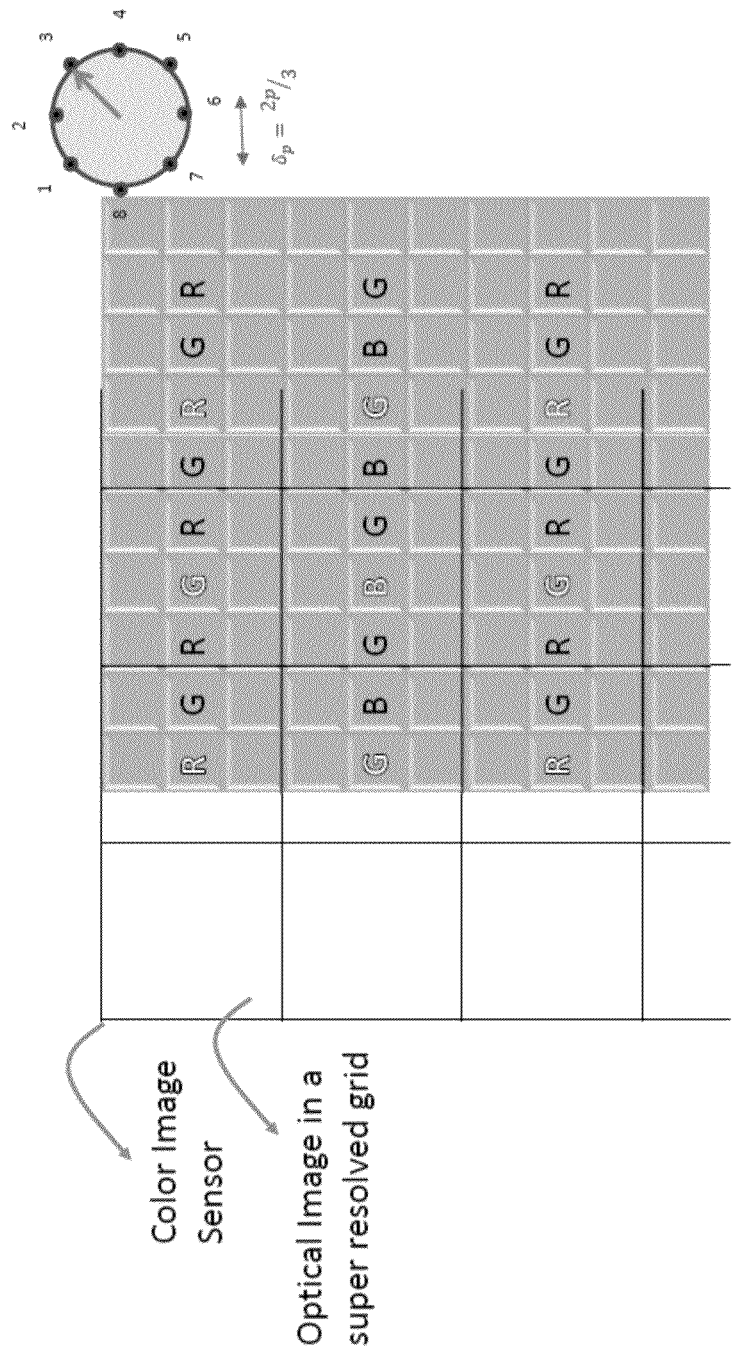
Figure 7E:
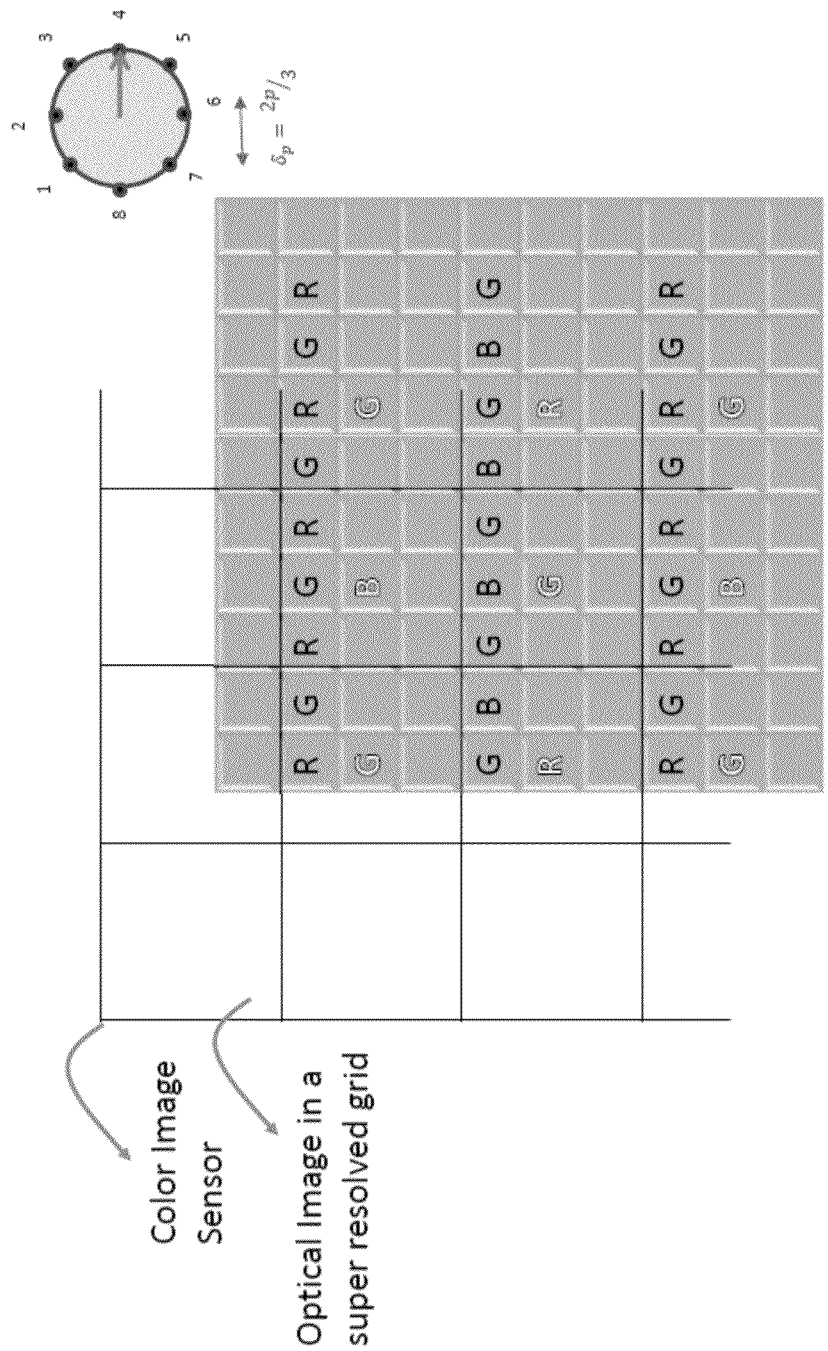
Figure 7F:
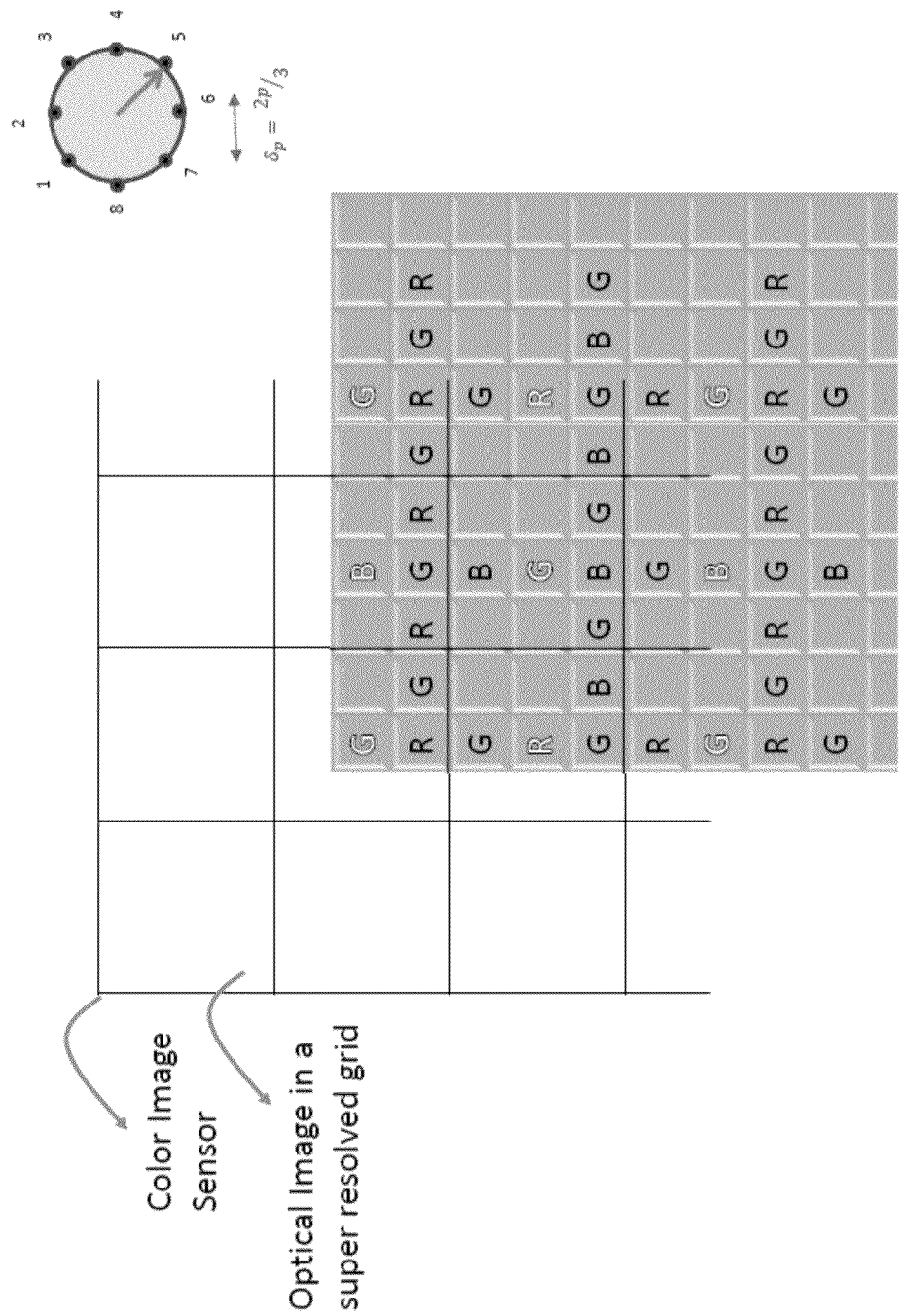
Figure 7G:
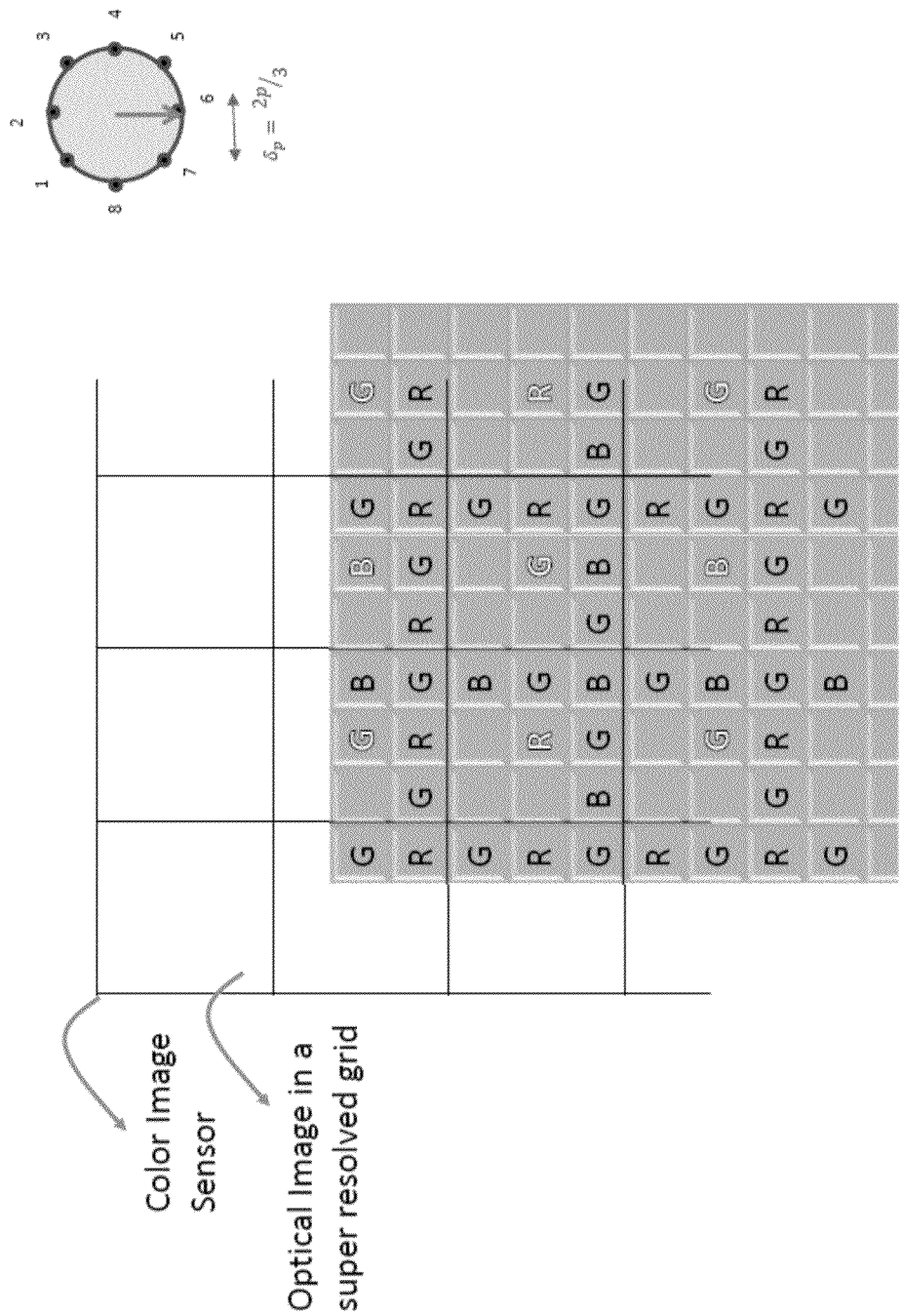
Figure 7H:
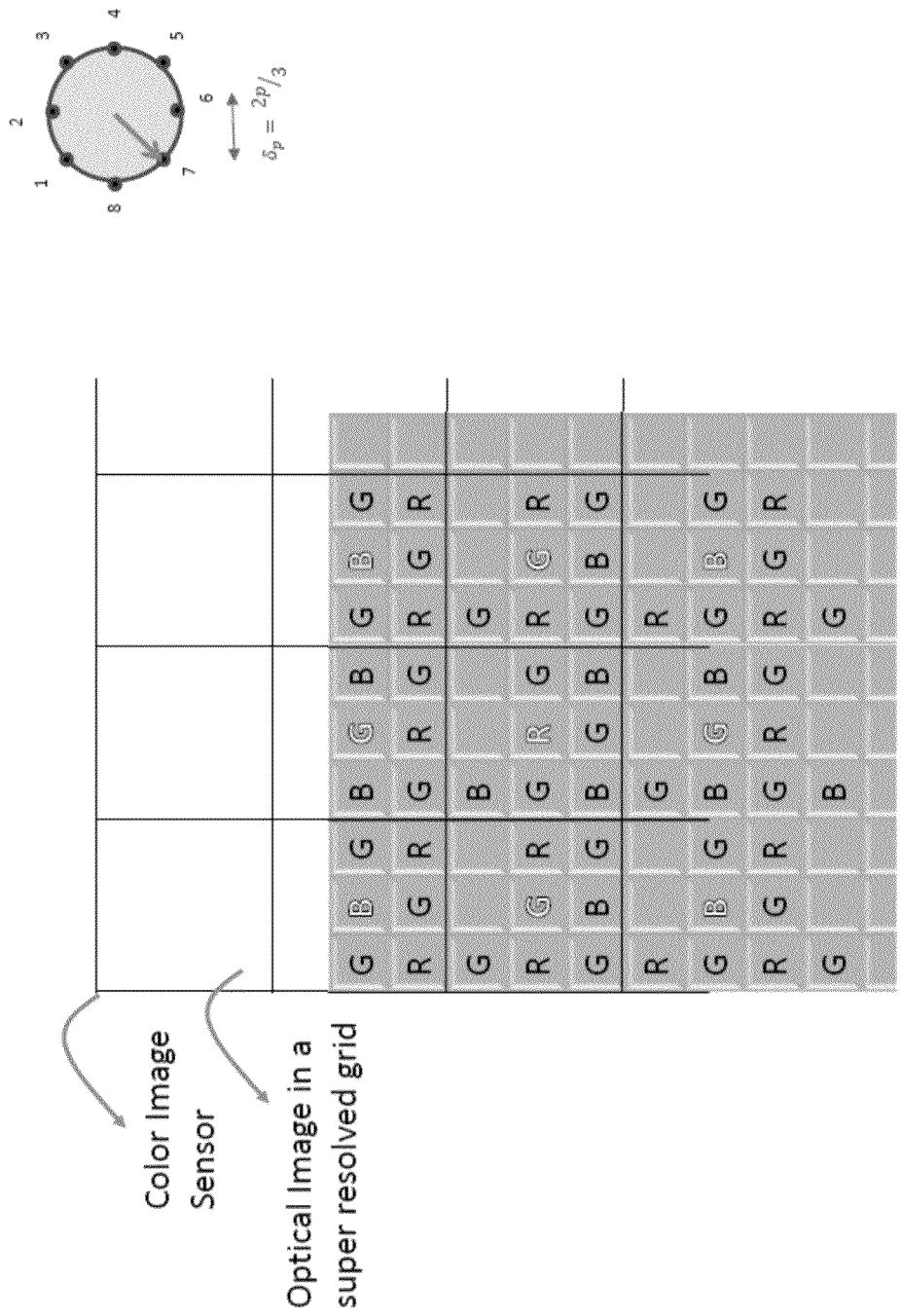

In block 606, the low-resolution images (video frames) are interleaved using the received direction vectors to form an intermediate high-resolution video frame. Interleaving assembles information from different low resolution frames into a high resolution frame. The interleaving process starts with the creation of an empty high resolution pixel grid. The high resolution pixel grid is then populated with pixels from low resolution video frames using their respective direction vectors. If a high resolution pixel grid is already available from a previous time, it is simply updated with pixels from the latest low-resolution video frame For example, FIG. 7A shows a low resolution pixel grid that corresponds to that of a Bayer color image sensor. Each low resolution image used by the super resolution algorithm exhibits the low resolution pixel grid. FIG. 7B depicts a high resolution pixel grid that is over lapped on top of the low resolution pixel grid in FIG. 7A. While the high resolution pixel grid represents the optical image, the low resolution grid represents the image sensor. According to some embodiments of the present invention, the optical image is translated on the surface of the image sensor using the time-varying phase shifts of the LPM. The inset on the top-right of the figure shows the direction vector of the LPM. In this example, the image shifts are located along a circular locus with 8 possible positions. FIG. 7B illustrates the overlay of optical image on the sensor at position 1 of the LPM. Similarly, FIG. 7C-7I show the overlay at LPM positions 2-8. At each position of the LPM, a new set of low resolution pixels are populated into the high resolution grid. The optimal shift distance $\delta_s$ enables the super-resolved image to retain the color diversity of the Bayer image sensor.

Finally, as shown in FIG. 7I, a super resolution (intermediate) pixel grid is obtained. However, as shown in FIG. 7J, this intermediate pixel grid has a missing center pixel, because the image shift in the example was along a circular locus. These missing center pixels can be estimated by acquiring a low resolution image with an optically flat mask with no linear phase shift. Such a mask would allow the light from scene to reach the image sensor unshifted, thereby allowing the detection of the missing center pixel. This is readily possible in an active LPM implementation where the electrical control signals can be specified to achieve a flat mask with a constant phase mask instead of a linear phase mask.

Figure 7K:
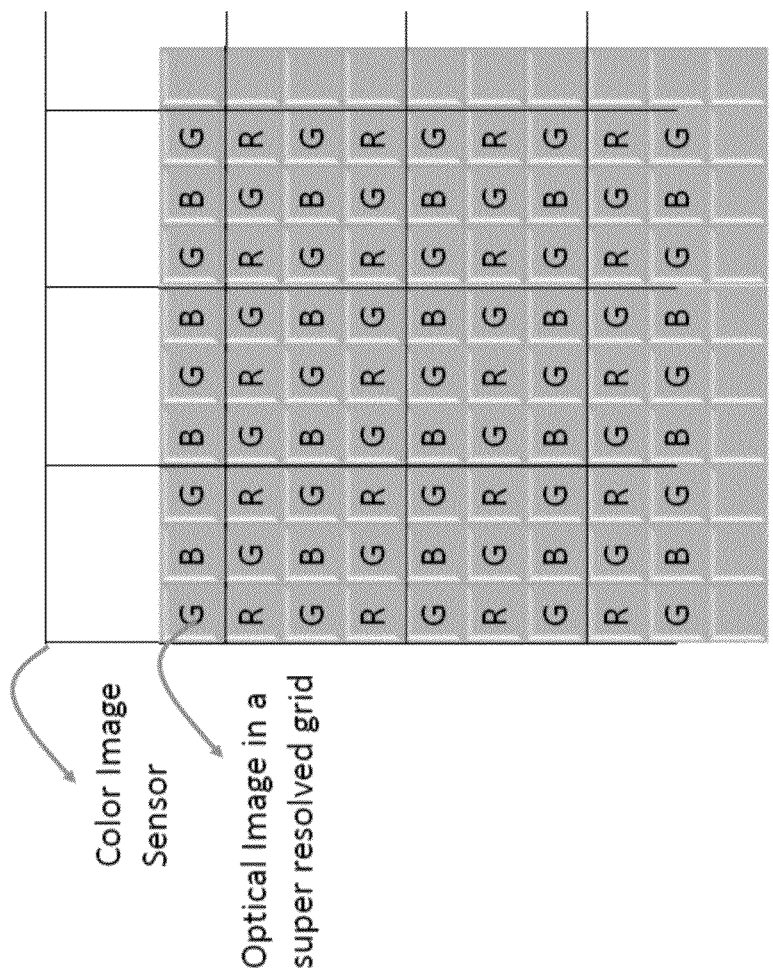

In the case of a passive LPM, conventional interpolation techniques may be used to estimate these missing central pixels. Since the number of the missing central pixels are small compared to the total number of pixel in super (high) resolution image, the interpolation does not introduce substantial amount of inaccuracy. The super resolution (intermediate) pixel grid including the missing center pixels is shown in FIG. 7K.

Referring back to FIG. 6, in block 608, the likelihood of pixel motion is estimated. Since the intermediate super resolution frame is created by combining multiple low resolution frames at different times, motion artifacts may be present in the frame if an object moves during the acquisition of low resolution frames. The present invention finds and corrects such motion artifacts to generate a high resolution frame with good image quality. In some embodiments, the likelihood of pixel motion is computed by comparing current image (video frame) with a previous image (video frame). Other known techniques of estimating pixel motions, such as sum of absolute differences, sum of squared differences, or cross correlation may also be used for this estimation.

In block 610, the high resolution intermediate image is compensated for any pixel motion, by replacing high resolution pixels in moving regions of the intermediate high resolution image with low-resolution pixels from the latest video frame. For example, consider a scene where an object moved during the acquisition of the dissimilar low resolution video frames. The intermediate high resolution frame formed by interleaving the dissimilar low resolution video frames would exhibit motion artifacts. The motion artifacts may manifest as a combination of image blur and inaccurate color rendering. The invention in block 608 estimates the likelihood of pixel motion, which essentially highlights regions of the intermediate high resolution frame that has motion artifacts. Using this information, regions with motion artifacts are located and corrected. The correction is performed by replacing high resolution pixel regions showing motion artifacts with low resolution pixels from the most recently acquired low resolution video frame Finally, in block 612, a final high resolution image is generated, which has been compensated for pixel motion.

By acquiring multiple dissimilar frames with a time-varying LPM and by processing them with a super resolution algorithm, high resolution images whose resolution exceed the native resolution of an image sensor may be generated. Accordingly, the present invention solves an inherent tradeoff between resolution and pixel size in image sensor design, where large pixel sizes show improved light sensitivity at the cost of reduced image resolution. By computationally enhancing image resolution, the invention allows image sensors to exhibit large pixel sizes without having to sacrifice resolution.

Figure 8:
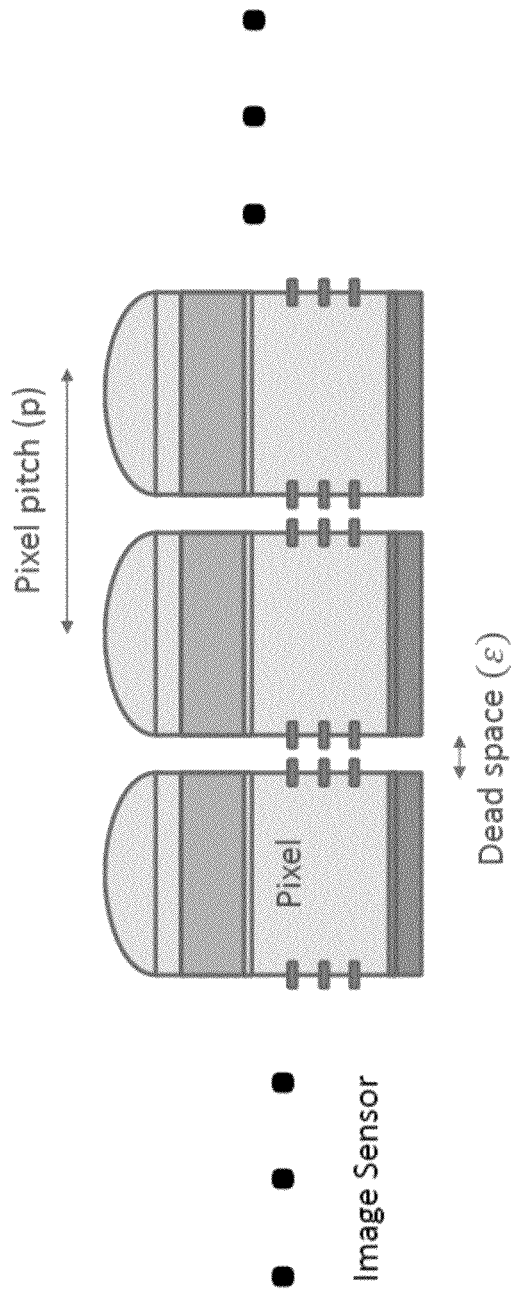
FIG. 8 shows an exemplary image sensor including a plurality of pixels, pixel pitches and dead spaces, according to some embodiments of the present invention.

There is an upper bound to achievable resolution enhancement, according to the present invention. FIG. 8 shows an exemplary image sensor including a plurality of pixels, pixel pitches and dead spaces, according to some embodiments of the present invention. As shown in the equation below, the maximum achievable super-resolution factor ($S_{max}$) is related to the pixel pitch (p) and the dead space ($\epsilon$) between the pixels. Pixel pitch is the distance between the centers of two neighboring pixels and dead space is the width of the space between the active photo detection areas of two neighboring pixels.

$$s_{max} = 4\left(\frac{p}{p-\varepsilon}\right)$$

The above expression may be understood with the following intuitive explanation. Although pixels of image sensors are often illustrated as a grid of squares, their response function is in reality not a rectangular function. Pixel response functions are in fact closer to that of a Gaussian function because of off-axis pixel lens losses and additional losses in the metal contacts of pixels. For example, pixel response of an optical image point falling on the center of the pixel is larger than an optical image point (with equal intensity and color as the previous point) falling at the edge of the pixel. Considering the well-known Rayleigh resolution limit, two points can be resolved as long as they are separated by over half the size of the system point spread function. When the dead space is 0, the smallest resolvable distance along one dimension is therefore half the size of the pixel response function, which is half the pixel pitch. This leads to a maximum of 2× super resolution along each dimension, resulting in a maximum 4× super-resolution for a 2D image sensor.

For a given pixel pitch, as dead space increases, the pixel size must decrease. At the limit when dead space becomes the same as the pixel pitch, the pixel size becomes infinitesimally small, leading to infinite super resolution factor. In practice, image sensor manufacturers try to minimize dead spaces in order to maximize light sensitivity. However, the fabrication constraints in image sensors, such as preventing neighboring pixel microlenses from attaching to each other, necessitate image sensor designs with non-zero dead spaces.

The above mentioned super-resolution factor is achievable if the optical lens that images the scene on the image sensor allows all spatial frequencies below $S_{max}/(2*p)$ lp/mm. If the optical resolution of the imaging lens is less than $S_{max}/(2*p)$ lp/mm, the super-resolution factor of the camera will be limited to maximum resolution of the lens.

The closed form expression for the maximum achievable super-resolution factor is useful to determine the optimal number of low-resolution images that are required to form a high resolution image. Acquiring more images than prescribed by the super resolution factor will not lead to any further improvement in image resolution. For example, if the maximum super-resolution factor is 8×, 8 low resolution images are sufficient to achieve the maximum achievable super-resolution with the image sensor.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for enhancing image resolution using optical image translation, the method comprising:
   receiving multiple dissimilar low-resolution images generated by a time varying linear phase mask (LPM);
   receiving a direction vector for each of the multiple dissimilar low-resolution images;
   interleaving the received multiple dissimilar low-resolution images using the received direction vectors to form an intermediate high-resolution image;
   computing a likelihood of pixel motion in the intermediate high-resolution image;
   compensating for pixel motion in the intermediate high-resolution image; and
   generating a final high-resolution image,
   wherein the method is executed by one or more processors.

2. The method of claim 1, wherein said LPM is a passive rotating mask.

3. The method of claim 1, wherein said LPM is an active liquid crystal based mask.

4. The method of claim 1, wherein said LPM is an active liquid lens based mask.

5. The method of claim 1, wherein the number of multiple dissimilar low resolution images is determined by a super-resolution factor, as a function of a pixel pitch and a dead space between pixels of an image sensor.

6. The method of claim 1, wherein each direction vector quantifies an angle and a magnitude of image shift, shifted by the LPM.

7. The method of claim 1, wherein said interleaving comprises:
   creating an empty high resolution pixel grid; and
   populating said empty high resolution pixel grid with pixels from the multiple dissimilar low resolution images using their respective direction vectors to generate said intermediate high resolution pixel grid.

8. The method of claim 7, wherein said populating comprises:
   overlapping a high resolution pixel grid representing an optical image on top of each of the multiple dissimilar low resolution images; and
   translating the optical image on a surface of an image sensor, using time-varying shifts of the LPM.

9. The method of claim 1, further comprising estimating values for missing center pixels in the intermediate high-resolution image; and replacing the missing center pixels with the estimated values, respectively.

10. The method of claim 1, wherein compensating for pixel motion comprises:
    computing likelihood of pixel motion by comparing a current image with a previous image; and
    correcting the high resolution intermediate image for any pixel motion, by replacing high resolution pixels in moving regions of the intermediate high resolution image with low-resolution pixels from a latest image.

11. The method of claim 10, wherein said correction comprises replacing high resolution pixel regions showing motion artifacts with low resolution pixels from the most recently acquired low resolution image.

12. A system for enhancing image resolution using optical image translation comprising:
    an optical lens for collecting light from an image;
    a time varying linear phase mask (LPM) for generating multiple dissimilar low-resolution images from the lens and a direction vector for each of the multiple dissimilar low-resolution images;
    an image sensor for detecting the multiple dissimilar low-resolution images generated by the LPM; and a processor configured to
      interleave the received multiple dissimilar low-resolution images using the received direction vectors to form an intermediate high-resolution image;
      compute a likelihood of pixel motion in the intermediate high-resolution image;
      compensate for pixel motion in the intermediate high-resolution image; and
      generate a final high-resolution image.

13. The system of claim 12, wherein said LPM is a passive rotating mask, an active liquid crystal based mask or an active liquid lens based mask.

14. The system of claim 12, wherein the number of multiple dissimilar low resolution images is determined by a super-resolution factor, as a function of a pixel pitch and a dead space between pixels of an image sensor.

15. The system of claim 12, wherein each direction vector quantifies an angle and a magnitude of image shift, shifted by the LPM.

16. The system of claim 12, wherein said interleaving comprises:
   creating an empty high resolution pixel grid; and
   populating said empty high resolution pixel grid with pixels from the multiple dissimilar low resolution images using their respective direction vectors to generate said intermediate high resolution pixel grid.

17. The system of claim 16, wherein said populating comprises:
   overlapping a high resolution pixel grid representing an optical image on top of each of the multiple dissimilar low resolution images; and
   translating the optical image on a surface of an image sensor, using time-varying shifts of the LPM.

18. The system of claim 12, wherein said processor is further configured to estimate values for missing center pixels in the intermediate high-resolution image; and replace the missing center pixels with the estimated values, respectively.

19. The system of claim 12, wherein compensating for pixel motion comprises:
   computing likelihood of pixel motion by comparing a current image with a previous image; and
   correcting the high resolution intermediate image for any pixel motion, by replacing high resolution pixels in moving regions of the intermediate high resolution image with low-resolution pixels from a latest image.

20. The system of claim 19, wherein said correction comprises replacing high resolution pixel regions showing motion artifacts with low resolution pixels from the most recently acquired low resolution image.

* * * * *